(12) United States Patent
Carra et al.

(10) Patent No.: US 7,870,881 B2
(45) Date of Patent: *Jan. 18, 2011

(54) TYRE FOR MEDIUM/HEAVY TRANSPORT VEHICLES

(75) Inventors: Alberto Carra, Milan (IT); Fabio Montanaro, Sesto San Giovanni (IT)

(73) Assignee: Pirelli Pneumatici S.p.A., Milan (IT)

( * ) Notice: Subject to any disclaimer, the term of this patent is extended or adjusted under 35 U.S.C. 154(b) by 597 days.

This patent is subject to a terminal disclaimer.

(21) Appl. No.: 11/209,715

(22) Filed: Aug. 24, 2005

(65) Prior Publication Data

US 2006/0048875 A1  Mar. 9, 2006

Related U.S. Application Data

(63) Continuation of application No. 09/953,890, filed on Sep. 18, 2001, now Pat. No. 7,041,184, which is a continuation of application No. PCT/EP00/02257, filed on Mar. 15, 2000.

(60) Provisional application No. 60/128,792, filed on Apr. 12, 1999.

(30) Foreign Application Priority Data

Mar. 18, 1999 (EP) .................................. 99830148

(51) Int. Cl.
*B60C 11/03* (2006.01)
*B60C 11/04* (2006.01)

(52) U.S. Cl. ............................ 152/209.14; 152/209.15; 152/209.16; 152/209.18; 152/209.24; 152/454

(58) Field of Classification Search ............ 152/209.14, 152/454, 209.15, 209.16, 209.18, 209.24
See application file for complete search history.

(56) References Cited

U.S. PATENT DOCUMENTS 3,176,748 A  4/1965  Giebhart (Continued)

FOREIGN PATENT DOCUMENTS

EP  1 024 032 A2  8/2000

(Continued)

OTHER PUBLICATIONS

Tsukagoshi; "Pneumatic Tire for Heavy Load," JP5077608 (Mar. 30, 1993) (Abstract Only).

(Continued)

*Primary Examiner*—Steven D Maki
(74) *Attorney, Agent, or Firm*—Finnegan, Henderson, Farabow, Garrett & Dunner, L.L.P.

(57) ABSTRACT

A method for reducing tire microsliding includes defining a rotation point and rotating a cross section profile about it. A cross section of a radially-external reference profile of a tread band includes a first rectilinear segment near at least one circumferential rib of a first shoulder portion. The first rectilinear segment extends axially outward beyond a corresponding shoulder edge point. A cross section profile of the at least one circumferential rib of the first shoulder portion includes a second rectilinear segment. The rotation point is on the first rectilinear segment, either the corresponding shoulder edge point itself or axially outward of it. The cross section profile of the first rectilinear segment is rotated to define the cross section profile of the second rectilinear segment, so that an axially-inner end of the second rectilinear segment is closer to the carcass structure than an axially-inner end of the first rectilinear segment.

36 Claims, 14 Drawing Sheets

U.S. PATENT DOCUMENTS

| | | | |
|---|---|---|---|
| 4,284,115 A | | 8/1981 | Ohnishi |
| 4,480,671 A | | 11/1984 | Giron |
| 4,739,812 A | | 4/1988 | Ogawa et al. |
| 5,616,195 A | | 4/1997 | Marquet et al. |
| 5,647,925 A | | 7/1997 | Sumiya et al. |
| 5,660,652 A | | 8/1997 | Young et al. |
| 5,769,978 A | * | 6/1998 | Lurois .................. 152/209.16 |
| 5,803,999 A | | 9/1998 | Shibata |
| 6,082,424 A | | 7/2000 | Miyazaki et al. |
| 6,116,309 A | | 9/2000 | Gillard et al. |
| 6,722,408 B2 | | 4/2004 | Naito |
| 7,041,184 B2 | * | 5/2006 | Carra et al. ............. 156/110.1 |
| 2002/0195182 A1 | | 12/2002 | Naito |

FOREIGN PATENT DOCUMENTS

| | | |
|---|---|---|
| FR | 2.128.232 | 10/1972 |
| JP | 2-81704 | 3/1990 |
| JP | 11-245622 | 4/1999 |
| WO | WO 92/02380 | 2/1992 |
| WO | WO 98/26945 | 6/1998 |
| WO | WO 98/58810 | 12/1998 |

OTHER PUBLICATIONS

Masashirou; "Pneumatic Radial Tire for Passenger Car," Patent Abstracts of Japan, of JP 09 142107 (Jun. 3, 1997) (Abstract Only).

C.M. Blow et al., "Rubber Technology and Manufacture," Institution of the Rubber Industry, pp. 349-356, (1971).

* cited by examiner

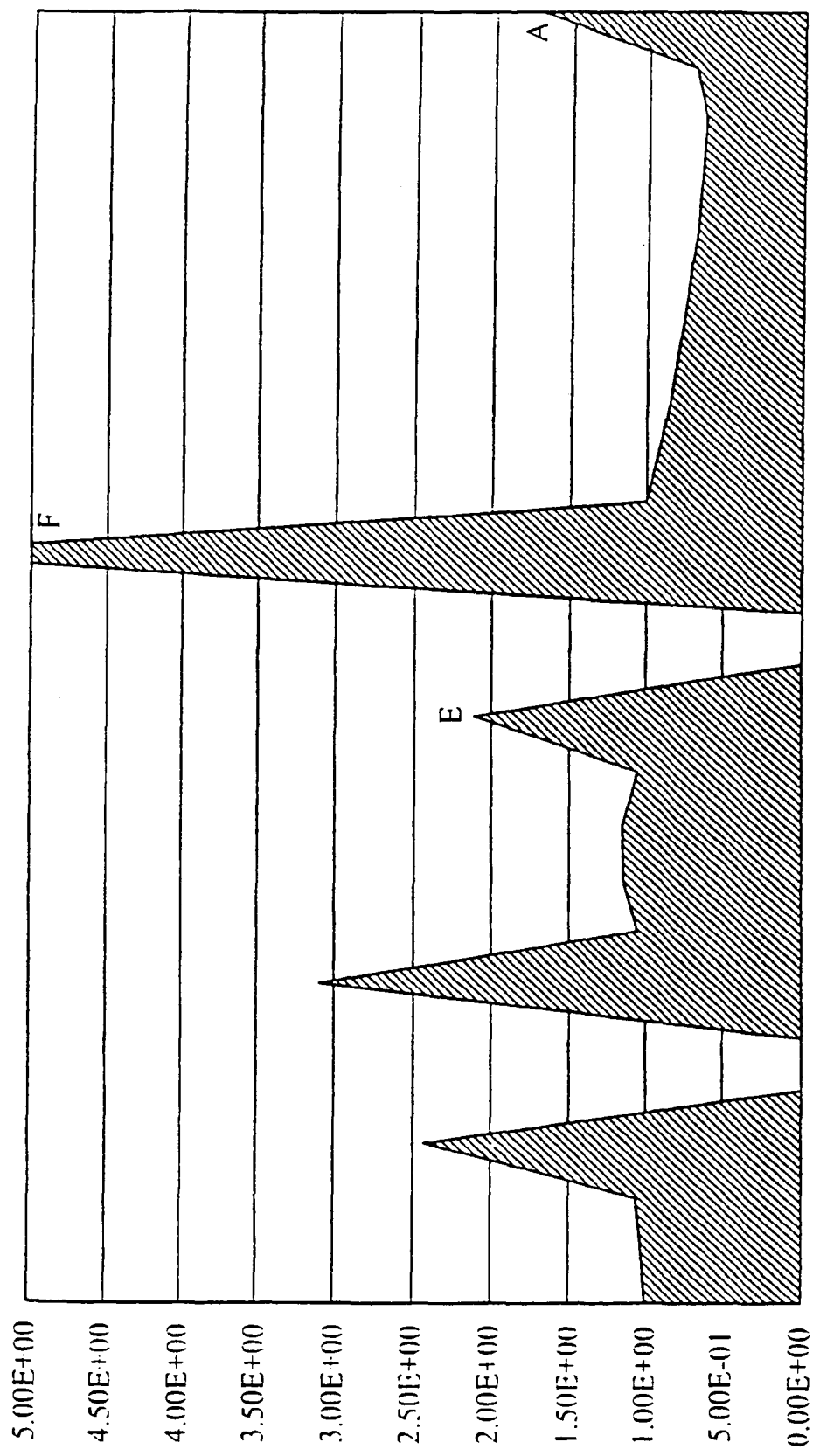

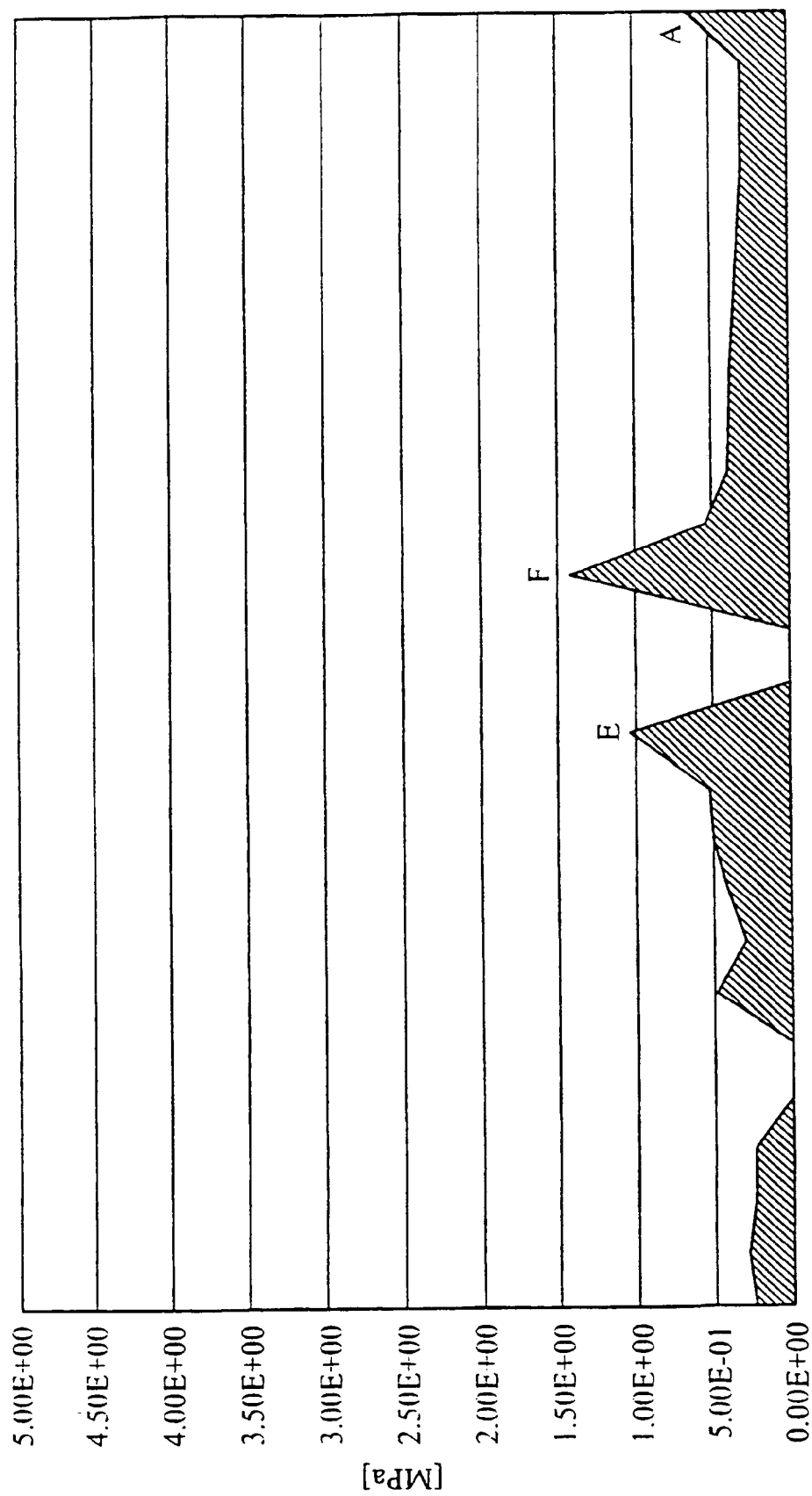

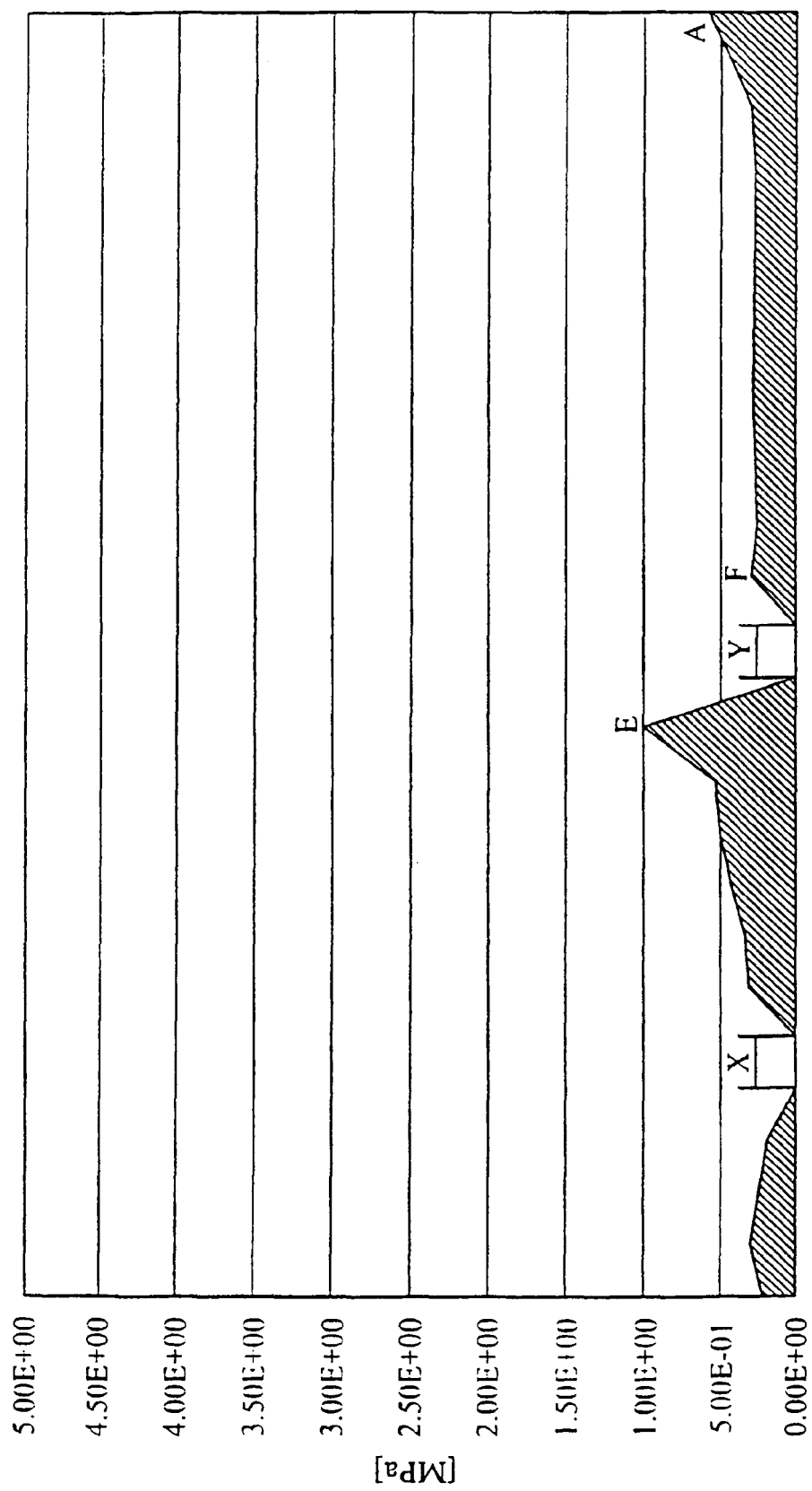

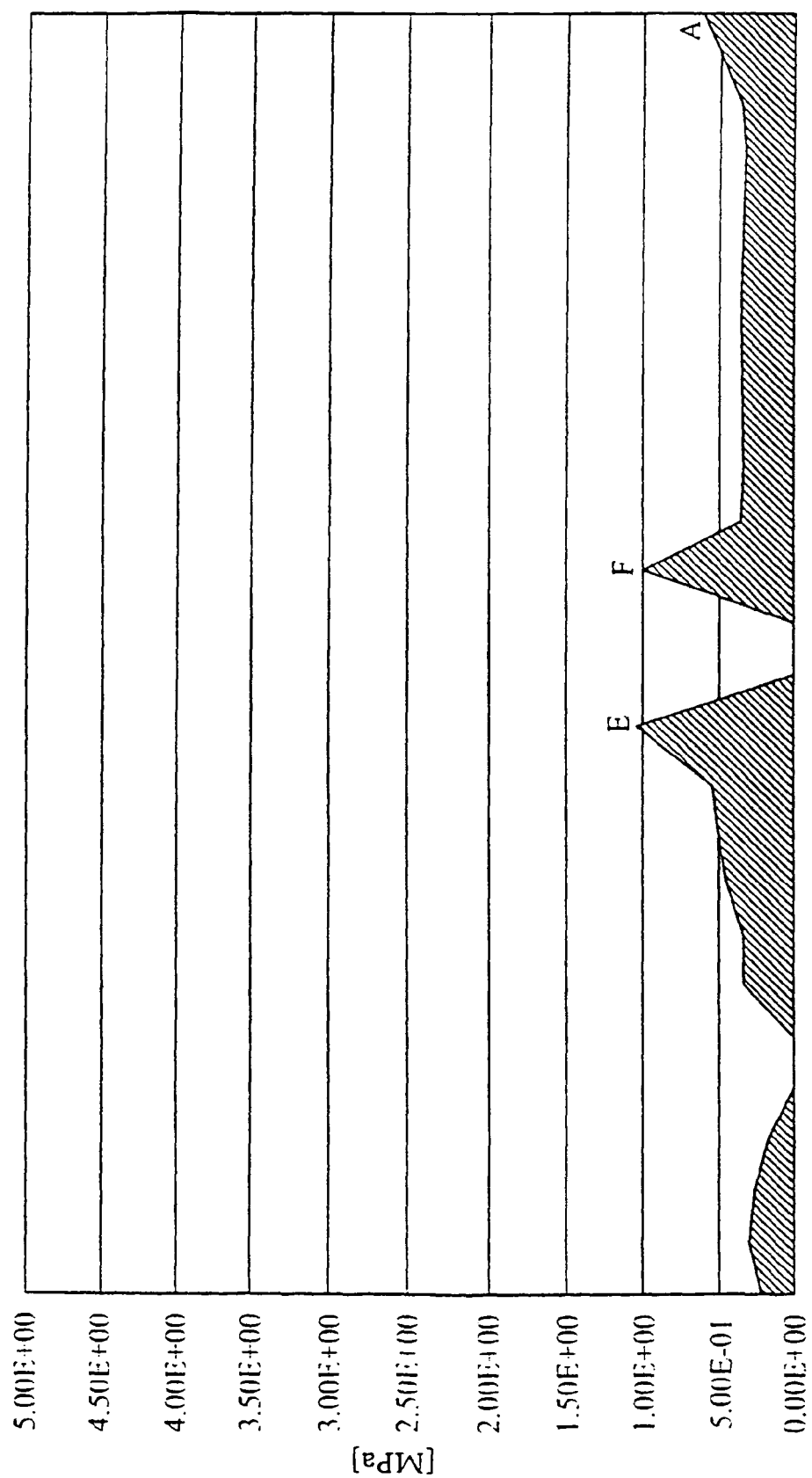

TYRE FOR MEDIUM/HEAVY TRANSPORT VEHICLES

CROSS-REFERENCES TO RELATED APPLICATIONS

This is a continuation of application Ser. No. 09/953,890, filed Sep. 18, 2001 now U.S. Pat. No. 7,041,184, which is a continuation of International Patent Application No. PCT/EP00/02257, filed Mar. 15, 2000, in the European Patent Office; additionally, Applicants claim the right of priority under 35 U.S.C. §119(a)-(d) based on patent application No. 99830148.5, filed Mar. 18, 1999, in the European Patent Office; further, Applicants claim the benefit under 35 U.S.C. §119(e) based on prior-filed, provisional application No. 60/128,792, filed Apr. 12, 1999, in the U.S. Patent and Trademark Office; the contents of all of which are relied upon and incorporated herein by reference.

BACKGROUND OF THE INVENTION

1. Field of the Invention

This invention relates to tyres for vehicle wheels, in particular tyres intended for use on the steering axle of trucks or articulated lorries for medium/heavy transport on long journeys, generally on motorways, at relatively high speed.

2. Description of the Related Art

Medium/heavy transport vehicles generally have different types of tyre fitted on the driving axles and steering axles depending on the different behavioural and functional prerogatives required of the tyres under the different working conditions in which they are used.

In general, tyres intended for use on the steering axle and for long motorway journeys need: good evenness of wear, combined with a good mileage; good directional stability and steering precision on dry surfaces; good grip on wet surfaces; good resistance with respect to tearing of the tread and to lateral shocks; low rolling resistance; and the ability to expel small stones trapped in the grooves. Factors contributing to producing these features are the tread design, the profile of the inflated tyre and the structure of the tyre.

In connection with the tread design, it is preferably of the type comprising a plurality of continuous circumferential ribs, two shoulder ribs and one or more centrally positioned ribs, delimited by a corresponding plurality of circumferential grooves.

The problem of uneven wear in tyres of this type is well-known in the art. For most of its life, the tyre is used for long journeys on straight stretches, with minimal stresses due to maneuvering and/or bends. In long journeys, the failure to optimize the distribution of the tyre/ground contact pressures on the tyre's footprint may lead to continuous microsliding of parts of the tread on the asphalt, consequently inducing premature wear of these parts of the tread and, in any case, uneven wear.

One of the parts of the tread particularly sensitive to this unevenness of wear is the shoulder zone comprising both the axially external edge of the shoulder rib and also the zone straddling the shoulder groove, i.e. the groove delimiting the aforementioned shoulder rib in the position axially internal to the latter. Various solutions have been proposed to solve the problem of uneven wear in the shoulder zone.

This invention derives from the perception of the technical problem of uneven wear in the shoulder zone of the tyre, dependent on the radially external profile of the surface of the tread in the said zone.

U.S. Pat. No. 4,480,671 describes a tyre for wheels of vehicles for heavy transport characterized in that the tread comprises in each of the two lateral zones a narrow circumferential groove which defines a lateral rib having a meridian profile substantially parallel and lowered with respect to the meridian profile of the geometrical envelope of the median zone of the tread. The width of the said lateral rib is at most equal to the maximal depth of the groove; the difference in level between the surface of the lateral ribs and that of the surface of the median zone of the tread is between 40% and 200% of the deflection of the tread under load and is such that, under normal working conditions, the said lateral ribs are in contact with the ground.

The patent application WO 92/2380 describes a tyre for wheels of vehicles for heavy transport comprising a radial carcass, a belt structure comprising at least two strips of different axial width and a tread band having in the lateral zones a circumferential groove of width preferably between 0.6 and 8 mm, delimiting a lateral rib the meridian profile of which is substantially parallel and lowered with respect to the meridian profile of the geometrical envelope of the median zone. The difference between the width of the tread band and the axial distance between the median axes of the lateral grooves is between 34 and 80 mm. This solution improves the separation resistance between the extremities of the belt strips and between the extremities of the entire belt structure and the carcass structure.

The patent application WO 98/26945 describes a tyre for wheels of vehicles for heavy transport comprising a tread band having a plurality of main ribs defined by circumferential grooves and a sacrifical rib in both the lateral zones of the tyre, separated from the main ribs by a narrow shoulder groove having a maximum width of 1.5 mm. The sacrifical rib has a width of between 2.5% and 12% of the width of the tread band and a constant radial lowering with respect to the transversal profile of the main ribs of between 0.5 and 2 mm, when the tyre is new.

The abstract of patent JP 05-77608 describes a radial tyre for wheels of heavy transport vehicles in which a pair of thin circumferential grooves is defined on the tread band. A first arc of a circle defines the tread profile between the equatorial plane and the thin groove and a second arc of a circle defines the profile of the tread between the thin groove and the shoulder edge, in order to radially lower the tread profile in the region around the thin circumferential groove, both towards the centre of the tread and towards the shoulder edge.

U.S. Pat. No. 5,660,652 describes a tyre for use on the steering axle comprising a tread having a plurality of continuous circumferential grooves, a pair of thin grooves in the shoulder zone, a pair of radially lowered ribs local to the shoulder edges and a plurality of main ribs. The tread has a radially external surface having a curvature initially defined by a radius of curvature internal to the tyre, followed by a curvature defined by a radius of curvature external to the tyre. The main shoulder rib has a progressively increasing thickness starting from the axially internal, adjacent circumferential groove and reaching a maximum value close to the thin groove. Straddling the said circumferential groove adjacent to the main shoulder rib, the tyre/ground contact pressures equalize, whereas a greater contact pressure is obtained on the shoulder edge. This distribution of tyre/ground contact pressures is obtained thanks to the progressive increase in thickness of the tread from the point of contraflexure corresponding to the inversion of the curvature to the thin shoulder groove. The added rubber effectively provides material in the tread shoulder region, where the propensity to wear is high, and increases the contact pressure of the region adjacent to the thin groove.

SUMMARY OF THE INVENTION

The Applicant has found that control of uneven and/or premature wear in the shoulder region of the tyre can be achieved more easily if the shoulder rib has a lowered profile composed of a rectilinear stretch rotated radially lowereds about its axially external edge.

Control of said wear is further improved if the shoulder groove is of asymmetrical type, signifying that the walls comprising this groove have different inclinations with respect to the axis of the groove itself.

In accordance with the above, and in a first of its aspects, the invention relates to a method for reducing the phenomena of tyre/ground microsliding local to at least one shoulder portion of a tyre provided with a tread band axially extending between two opposite edges, each delimiting in an axially external position a corresponding shoulder portion. The said tread band is provided with a raised pattern comprising a plurality of circumferential ribs delimited by a corresponding plurality of circumferential grooves, and has on its cross section a radially external reference profile comprising a first rectilinear segment local to at least one circumferential rib of the said shoulder portion; this rectilinear segment extends axially outwards beyond the said edge of the said shoulder portion. This method is characterized in that it assigns the said at least one circumferential rib of the said shoulder portion a cross section profile composed of a second rectilinear segment rotated radially lowereds about a point lying on the said first rectilinear segment in a position axially not internal to the said edge of the said shoulder portion.

Preferably the said second rectilinear segment is rotated about the said edge of the said shoulder portion.

Alternatively the said second rectilinear segment is rotated about the point of intersection of the first rectilinear segment with a straight line tangent to the side of the said tread band.

According to another variant, the said second rectilinear segment is rotated about a point removed from the said shoulder edge by a distance preferably not more than 30% of the total width of the said tread band. Still more preferably the said distance is between 10% and 30% of the total width of the said tread band.

In a variant of the invention, the method consists in providing the said at least one circumferential shoulder rib with a further circumferential groove suitable for defining a sacrifical portion intended to protect the said tread band from phenomena of uneven wear.

In a second aspect, the present invention relates to a tyre for wheels of vehicles comprising a carcass structure including a central crown portion and two axially opposite sidewalls terminating in a pair of beads for attachment to a rim of a wheel; a belt structure coaxially associated with the carcass structure; a tread band extended coaxially about the belt structure, the said tread band being axially extended between two opposite edges, each delimiting in an axially external position a corresponding shoulder portion. The said tread band is provided with a raised pattern comprising a plurality of circumferential ribs delimited by a corresponding plurality of circumferential grooves and has on its cross section a radially external reference profile comprising a first rectilinear segment local to at least one circumferential rib of the said shoulder portion; this first rectilinear segment extends axially outwards beyond the said edge of the said shoulder portion. The cross section profile of the said at least one circumferential rib of the shoulder portion is composed of a second rectilinear segment rotated radially lowereds about a point lying on the said first rectilinear segment in a position axially not internal to the said edge of the said shoulder portion.

Preferably, the said second rectilinear segment is rotated about the said edge of the said shoulder portion. Alternatively the said second rectilinear segment is rotated about the point of intersection of the said first rectilinear segment with a straight line tangent to the side of the said tread band.

According to another variant, the said second rectilinear segment is rotated about a point removed from the said shoulder edge by a distance preferably not more than 30% of the total width of the said tread band. Still more preferably, the said distance is between 10% and 30% of the total width of the said tread band.

Preferably, the circumferential shoulder groove corresponding in an axially internal position to the said at least one circumferential shoulder rib is of asymmetrical type.

In particular, the cross section profile of the said tread band is made from the consecutive succession of a curving stretch and the said second rectilinear segment and has a discontinuity local to the contacting point between the said curving stretch and the said first rectilinear segment of the reference profile. Preferably the said discontinuity is between 0.2 mm and 1.5 mm, more preferably between 0.3 mm and 1 mm.

According to a second embodiment, the tread band comprises at least one further circumferential groove dividing the said at least one circumferential rib of the shoulder portion into respectively a first and a second circumferential shoulder ribs.

In particular, the cross section profile of the said second circumferential shoulder rib is parallel and lowered with respect to the second rectilinear segment of the cross section profile of the tread band. Preferably this lowering is between 0.1 mm and 1.5 mm.

In particular, the depth of this further circumferential groove is between 70% and 100% of the depth of the circumferential grooves.

In particular, the width of the said second circumferential shoulder rib is between 25% and 40% of the width of the shoulder portion, preferably equal to 33% of the total width of the shoulder zone.

BRIEF DESCRIPTION OF THE DRAWINGS

Further characteristics and advantages will become more clearly apparent in the light of the detailed description of some preferred embodiments of a tyre for medium/heavy transport vehicles according to this invention. The description provided below refers to the accompanying drawings, provided purely for explanatory, non-restrictive purposes, in which:

FIGS. 4a, 4b, 4c illustrate in a Cartesian plane the pattern of the tyre/ground contact pressure respectively in a portion close to the extremities of the footprint area and in a central portion of the footprint area for a reference tread band;

FIGS. 5a, 5b, 5c illustrate in a Cartesian plane the pattern of the tyre/ground contact pressure respectively in a portion close to the extremities of the footprint area and in a central portion of the footprint area for a tread band according to the invention;

FIGS. 6a, 6b, 6c illustrate in a Cartesian plane the pattern of the tyre/ground contact pressure respectively in a portion close to the extremities of the footprint area and in a central portion of the footprint area for a further embodiment of a tread band according to the invention;

DETAILED DESCRIPTION OF THE PREFERRED EMBODIMENTS

The tyre for vehicle wheels according to the invention comprises a carcass structure including a central crown portion and two axially opposite sidewalls terminating in a pair of beads for attachment to a rim of a wheel; a belt structure coaxially associated with the carcass structure; a tread band extended coaxially around the belt structure.

Figure 1:
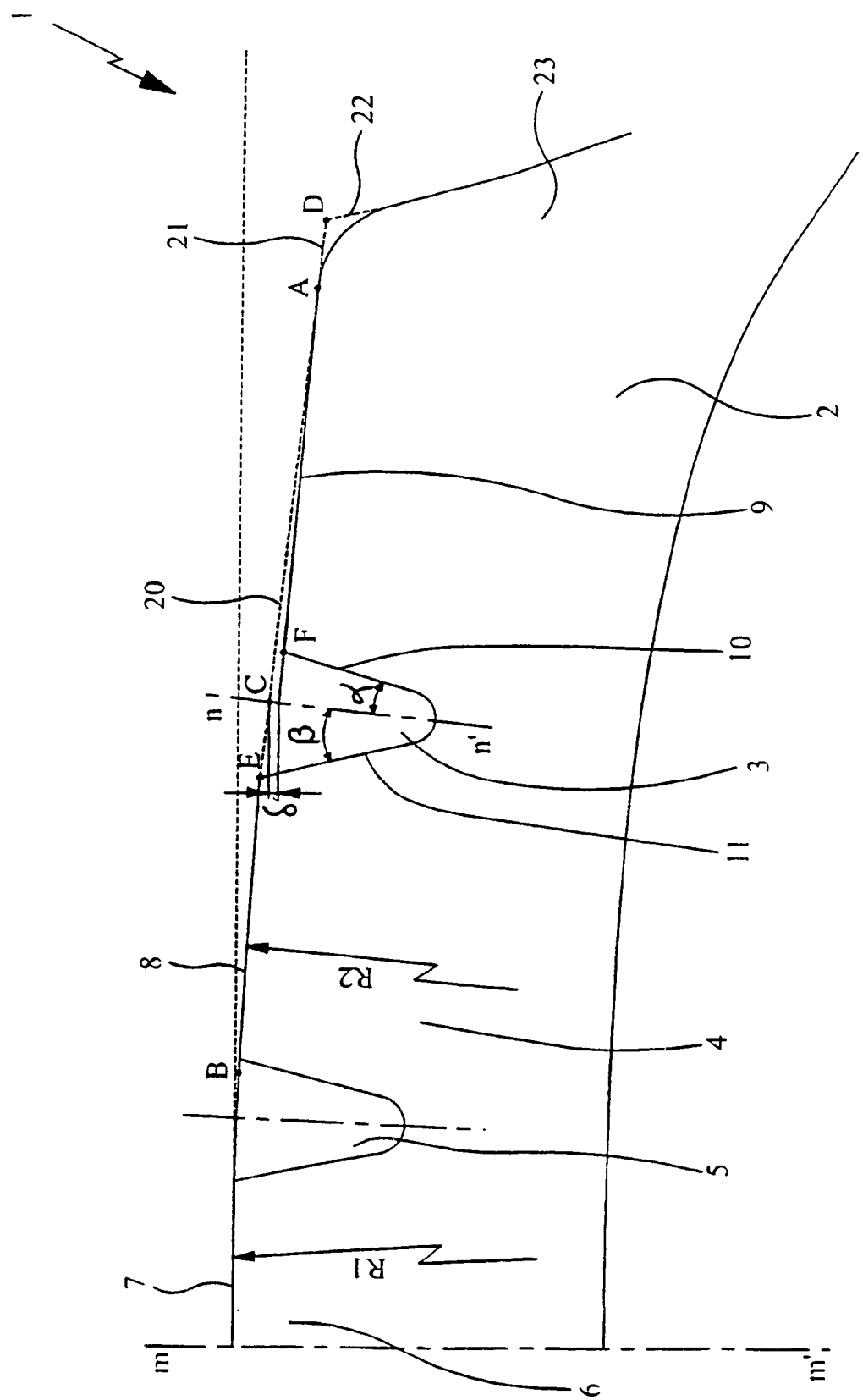
FIG. 1 shows a partial, cross section view of the profile of a tread band of a tyre according to the invention.

Depicted in FIG. 1 is a partial cross section of the profile of a tread band 1 of the tyre according to the present invention; the remaining construction parts of the tyre are not taken into consideration as they are known and not particularly relevant for the purposes of the invention. For the purpose of greater descriptional clarity of the said tread band, this tread band is represented only partially as it is symmetrical with respect to the equatorial plane m-m'.

With reference to FIG. 1, the tread band 1 comprises:

a pair of circumferential shoulder ribs 2 disposed symmetrically with respect to the equatorial plane m-m' of the tyre, with which the said tread band 1 is associated, the said circumferential shoulder ribs 2 being delimited between respective shoulder edges A of the tread band 1 and respective circumferential shoulder grooves 3 axially removed from the respective shoulder edges A;

a pair of intermediate circumferential ribs 4 disposed symmetrically with respect to the equatorial plane m-m' of the tyre and delimited respectively between the abovementioned circumferential shoulder grooves 3 and respective intermediate circumferential grooves 5, the latter being axially removed from the abovementioned circumferential shoulder grooves 3;

a central circumferential rib 6, the axis of symmetry of which belongs to the abovementioned equatorial plane m-m' of the tyre in question.

As stated above, throughout the remainder of this description, reference will be made only to one half of the profile of the tread band 1 according to the invention, more precisely to the half between the equatorial plane m-m' and the shoulder edge A, it being understood that the observations made are also to be considered equally valid for the half of the abovementioned profile between the equatorial plane m-m' and the axially opposite shoulder edge.

With specific reference to the embodiment of the invention illustrated in FIG. 1, the tread band 1 according to the invention has a first curving stretch 7, with radius of curvature $R_1$, which extends from the equatorial plane m-m' to a point B where the condition of tangency is realized between the said first curving stretch 7 and a second curving stretch 8 with radius of curvature $R_2$.

It should be stressed that, in accordance with an embodiment not illustrated, the profile of the tread band 1 according to this invention may have a single radius of curvature. Further, in the event of, as described above, the said profile having a pair of distinct radii of curvature, the latter can have different lengths. Although the second radius of curvature $R_2$ is preferably greater than the first radius of curvature $R_1$, in some embodiments said ratio can be inverted.

As illustrated in FIG. 1, the first curving stretch 7 constitutes the profile of the tread band 1 in the area corresponding to the central circumferential rib 6 and to a first portion of the intermediate circumferential groove 5 as far as the abovementioned point of tangency B from where, as recalled, the second curving stretch 8 referred to above departs. The said second curving stretch 8 constitutes, therefore, the profile of the tread band 1 from the point B to a point C where a condition of contact is realized between the said second curving stretch 8 and the rectilinear segment 20 of the reference profile.

The curving stretch 8 therefore represents the profile of the tread band 1 in the zone corresponding to the remaining second portion of the intermediate circumferential groove 5, and also in the zone corresponding to the intermediate circumferential rib 4 and to the first portion of the circumferential shoulder groove 3 to the abovementioned point C.

In the embodiment of the invention illustrated in FIG. 1, the point of tangency B between the abovementioned first curving stretch 7 and second curving stretch 8 lies internally to the intermediate groove 5. Nevertheless, it is worthwhile remembering that in other embodiments not illustrated the said point B may be located local to the intermediate circumferential rib 4.

In accordance with this invention, the profile of the tread band 1 is therefore composed of a rectilinear segment 9 following the second curving stretch 8 and suitably rotated with respect to the reference profile according to the arrangements described below.

Having defined as D (see in particular FIG. 1) the point of intersection between the rectilinear segment 20 of the reference profile and a straight line 22 tangent to the side 23 of the tread band 1, the rectilinear segment 9 constituting the cross section profile of the shoulder rib 2 according to this invention is rotated, radially towards the inside of the tread band 1, about the abovementioned point of intersection D. According to an embodiment not illustrated, the fulcrum point of the rotation is coincident with the edge A. According to another embodiment of the present invention, not illustrated, the said fulcrum point belongs to the linear continuation 21 of the rectilinear segment 20 of the reference profile, in the direction axially external to the edge A. More particularly, the said fulcrum point is removed from the abovementioned edge A by at most a distance equal to 30% of the total width of the tread band, preferably by a distance equal to 10% of the said width.

The said rectilinear segment 9 is therefore in a lower position than the reference profile, giving rise to a discontinuity in the cross section profile of the tread band 1 according to the invention. The height δ of the said discontinuity is measured, when the tyre is new, on coming out of the mould, at the point C, i.e. at the point of passage from the second curving stretch 8 to the rectilinear segment 9 referred to above, the said point C being local to the circumferential shoulder groove 3. In addition, defining with E and F the outer edge of the intermediate circumferential shoulder rib 2 respectively, the discontinuity referred to above has the effect that the point F does not lie on the abovementioned reference profile, but belongs instead to the rectilinear segment 9 of the profile of the tread band 1 according to the invention, therefore being in a lower position than the point E. Further, an axially-inner end of the rectilinear segment 9 is located in a radially outer position with respect to an axially-outer end of the rectilinear segment 9.

In general, the value of δ is between 0.2 mm and 1.5 mm, more preferably between 0.3 mm and 1 mm. With particular reference to the embodiment illustrated in 10 FIG. 1, δ is equal to 0.35 mm.

With particular reference to FIG. 1, the point of tangency B is located inside the intermediate circumferential groove 5 at a distance from the equatorial plane m-m' of between 10% and 15% of the total width of the tread band. By total width of the tread band is meant the axial distance between the edges A of the said tread band.

In addition, the distance between the axis n-n' of the circumferential shoulder groove 3 and the equatorial plane m-m' is between 20% and 40% of the total width of the tread band.

According to a preferred embodiment of this invention, the circumferential shoulder groove 3 is an asymmetrical type of groove where this is taken to mean that the walls 10, 11 constituting the said groove are inclined differently from each other to the abovementioned axis n-n' perpendicular to the rectilinear segment 20 of the reference profile. More specifically, the axially external wall 10 of the circumferential shoulder groove 3 is less inclined than the axially internal wall 11 of the circumferential shoulder groove 3. According to the embodiment illustrated in FIG. 1, the angle α formed between the wail 10 and the axis n-n' is of 13°, whereas the angle β formed between the wall 11 and the axis n-n' is of 18°. Preferably the value of a is between 7° and 16°, while the value of β is between 14° and 22°; furthermore, and still more preferably, the difference between the said angles α and β is between 4° and 8°.

The depth of the circumferential shoulder groove 3 is preferably between 10 mm and 19 mm; with particular reference to FIG. 1, the said depth is 15.5 mm.

In addition, the width of the circumferential shoulder groove 3 is preferably between 2 mm and 18 mm, more preferably between 8 mm and 16 mm.

It should be stressed that the portion of tread band 1 which is axially internal to the circumferential shoulder groove 3 may be provided with any number of grooves and/or ribs which are provided with any geometry and are not particularly relevant for the purposes of this invention.

According to a further embodiment of the present invention, the circumferential shoulder rib 2 is provided with a further circumferential groove 12 (illustrated in FIG. 2) of smaller dimensions than the grooves 3, 5 referred to above, the said further circumferential groove 12 dividing the abovementioned circumferential shoulder rib 2 into a first 13 and a second 14 circumferential rib. According to this further embodiment, the profile of the first circumferential rib 13 thus obtained is coincident with the rectilinear segment 9 referred to above only along the portion of the profile lying between the point F and a point G defining the external edge of the first circumferential rib 13.

According to a further embodiment, the profile of the second circumferential rib 14, composed of a rectilinear stretch 15, is parallel and lowered with respect to the rectilinear segment 9, the said rectilinear stretch 15 extending from a point H, representing the inner edge of the second circumferential 35 rib 14, to a new shoulder edge A' of the tread band 1 according to this invention. The abovementioned parallel lowering of the rectilinear stretch 15 gives rise, therefore, to a second discontinuity of height δ' defined respectively between the points G and H, the said height δ' representing the distance respectively between the rectilinear segment 9 and the rectilinear stretch 15 which are parallel to each other.

In general, the value of δ' is preferably between 0.1 mm and 1.5 mm. In accordance with FIG. 2, δ' is 0.5 mm. In said embodiment too, it is possible to rotate the rectilinear stretch 15 as previously described with reference to the first embodiment.

Figure 2:
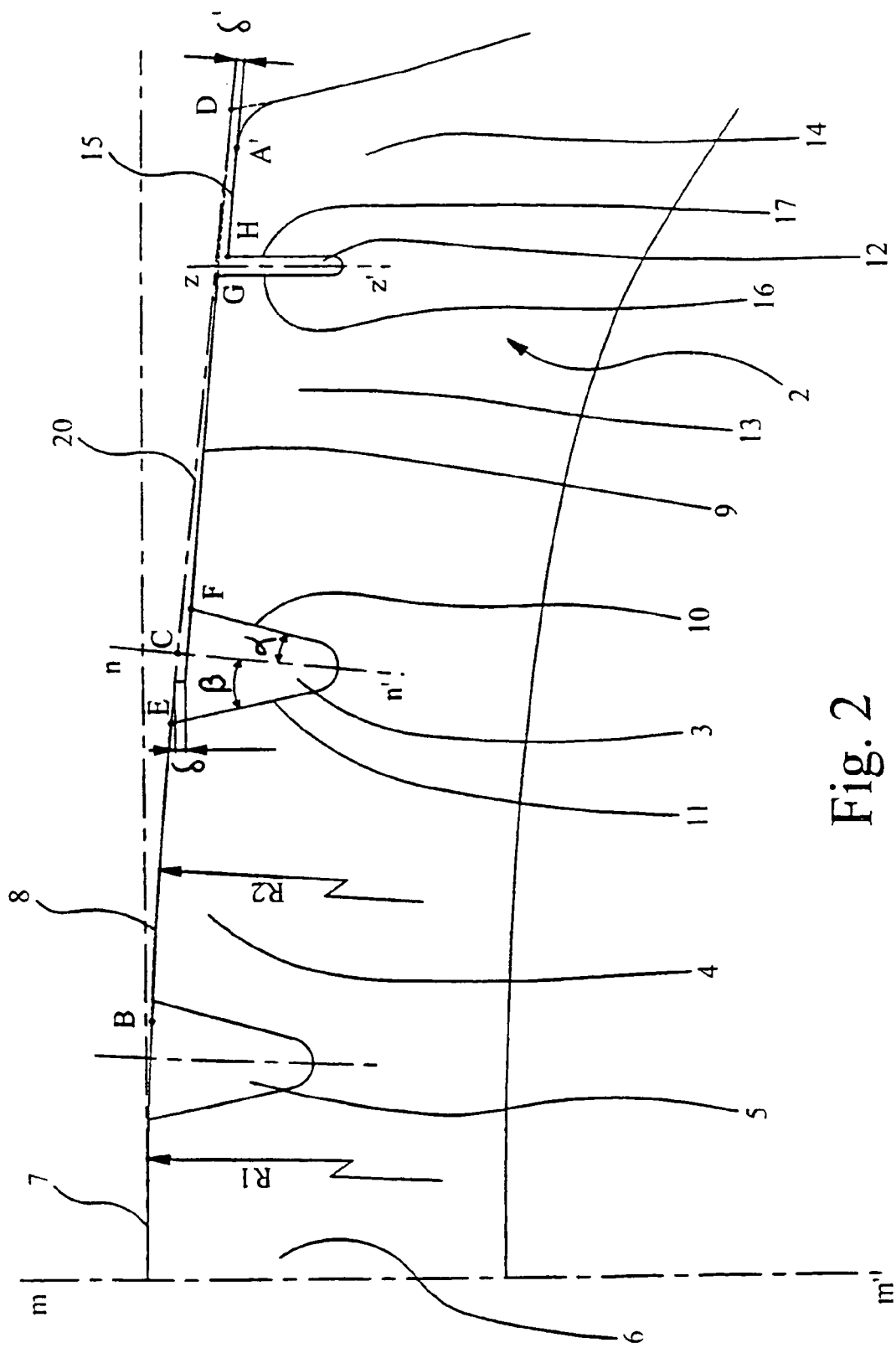
FIG. 2 shows a partial, cross section view of a further embodiment of the profile of a tread band of a tyre according to the invention.

The further circumferential groove 12 illustrated in FIG. 2 is preferably a symmetrical type groove, the inclination of the walls 16, 17 of which being 1° with respect to their axis z-z', and having a width of preferably between 1.6 mm and 2.5 mm.

In accordance with the invention, the depth of the further circumferential groove 12 is preferably between 70% and 100% of the depth of the main grooves, i.e. of the central and shoulder grooves. Furthermore, the width of the second circumferential rib 14, i.e. the width of the portion of shoulder external to the abovementioned further circumferential groove 12, is preferably between 25% and 40% of the total width of the shoulder zone, where by total shoulder width we mean the portion of tread band 1 axially external to the circumferential shoulder groove 3. More preferably, the width of the second circumferential rib 14 is equal to 33% of the total width of the shoulder zone.

In accordance with this second embodiment illustrated in FIG. 2, the second circumferential rib 14 acts as a sacrifical portion meaning that, as the name itself suggests, by wearing itself down, said portion permits the remaining part of the tread band to be protected from undesirable propagations of uneven wear phenomena towards the inside of the tread band, i.e. in the direction of the abovementioned axis n-n'. This barrier effect is, moreover, guaranteed by the interposition of the abovementioned further circumferential groove 12, which de facto physically prevents—or at least slows down—the envelope of uneven wear towards the abovementioned equatorial plane of the tyre. On this point, in fact, it should be pointed out that the second circumferential rib 14, created by the further circumferential groove 12, is constantly in contact with the ground during the normal working conditions of the tyre.

The tread band according to the present invention permits an optimal distribution of the tyre/ground contact pressures so as to avoid, or at least delay, the beginnings of uneven wear which causes premature deterioration of the tread band of the tyre. This deterioration has a negative effect on tyre life, obliging the user to replace the tyre early on, even though a remaining portion of the tread is still abradable. In general, the said uneven wear occurs most prematurely on the tyres for steering axles intended for use on long motorway journeys, that is to say on tyres with very low abrasion severity. In this form of use, the uneven wear is located particularly:

around the outer edge of the circumferential shoulder rib, and around the tread portion adjacent to the outer circumferential groove, particularly on the inner side of the latter, i.e. on the side closest to the equatorial plane of the tyre.

The Applicant has noted that a conventional tread band having a reference profile of the type illustrated in FIGS. 1 and 2, that is to say having a tread band provided in the shoulder portion with a circumferential shoulder rib 2 and a circumferential shoulder groove 3, is tendentially liable to an increase in the value of the tyre/ground contact pressure in the region of the axially inner edge of the circumferential shoulder rib 2. Accordingly, this means that there is generally a greater contact pressure at the point F than at the point E, a fact that results in a relative tyre/ground microsliding at the point E, consequently inducing uneven wear which originates at this point and tends to propagate rapidly in the portion of tread adjacent thereto, in the direction of the equatorial plane m-m' of the tyre.

The profile of the tread band according to the present invention is such as to guarantee an optimal local distribution of the tyre/ground contact pressures eliminating, or at least considerably reducing, the risk of inducing the uneven wear patterns illustrated above. More specifically, with reference to the first embodiment illustrated in FIG. 1, the discontinuity of height δ of the tread band according to this invention gives rise to an increase in the tyre/ground contact pressure at the point E, as compared to the case of a reference tyre not provided with the abovementioned discontinuity of height δ. In conjunction with the increased tyre/ground contact pressure at the point E, the profile of the tread band according to this invention also permits a reduction in the contact pressure at the point F, i.e. the point at which, in the case of the reference tyre, there is an undesirable increase in the contact pressure.

A further and advantageous aspect of the present invention consists of the fact that the above-illustrated discontinuity of height δ produces an increase in the tyre/ground contact pressure also in corrispondence of the edge A, thus allowing more even wear of the shoulder portion of the tread band.

The tread band according to this invention permits the contact pressure to be increased locally at the points usually most prematurely affected by the emergence of uneven wear phenomena, reducing the relative tyre/ground microsliding and, as a result, promoting an advantageous reduction in the local abrasion of the tread compound.

With reference to the second embodiment of the present invention (illustrated in FIG. 2), in the same way as described above with reference to the first embodiment (illustrated in FIG. 1), the presence of the second discontinuity of height δ' has the effect of increasing the tyre/ground contact pressure local to the point G with respect to the point H, thus protecting the point G from the risk of inducing undesirable uneven wear patterns, or at least postponing in time the beginning of these undesirable phenomena. The profile of the tread band according to the invention therefore permits the natural abrasion of the tread compound, intrinsic to the use of the tyre, to be localized in the external part of the shoulder zone, i.e. to be restricted to the second circumferential rib 14. Further, the said second discontinuity of height δ' is advantageously maintained throughout operation of the tyre, thereby constituting an effective barrier in time to the propagation of uneven wear patterns towards the inner part of the tread band.

Figure 3:
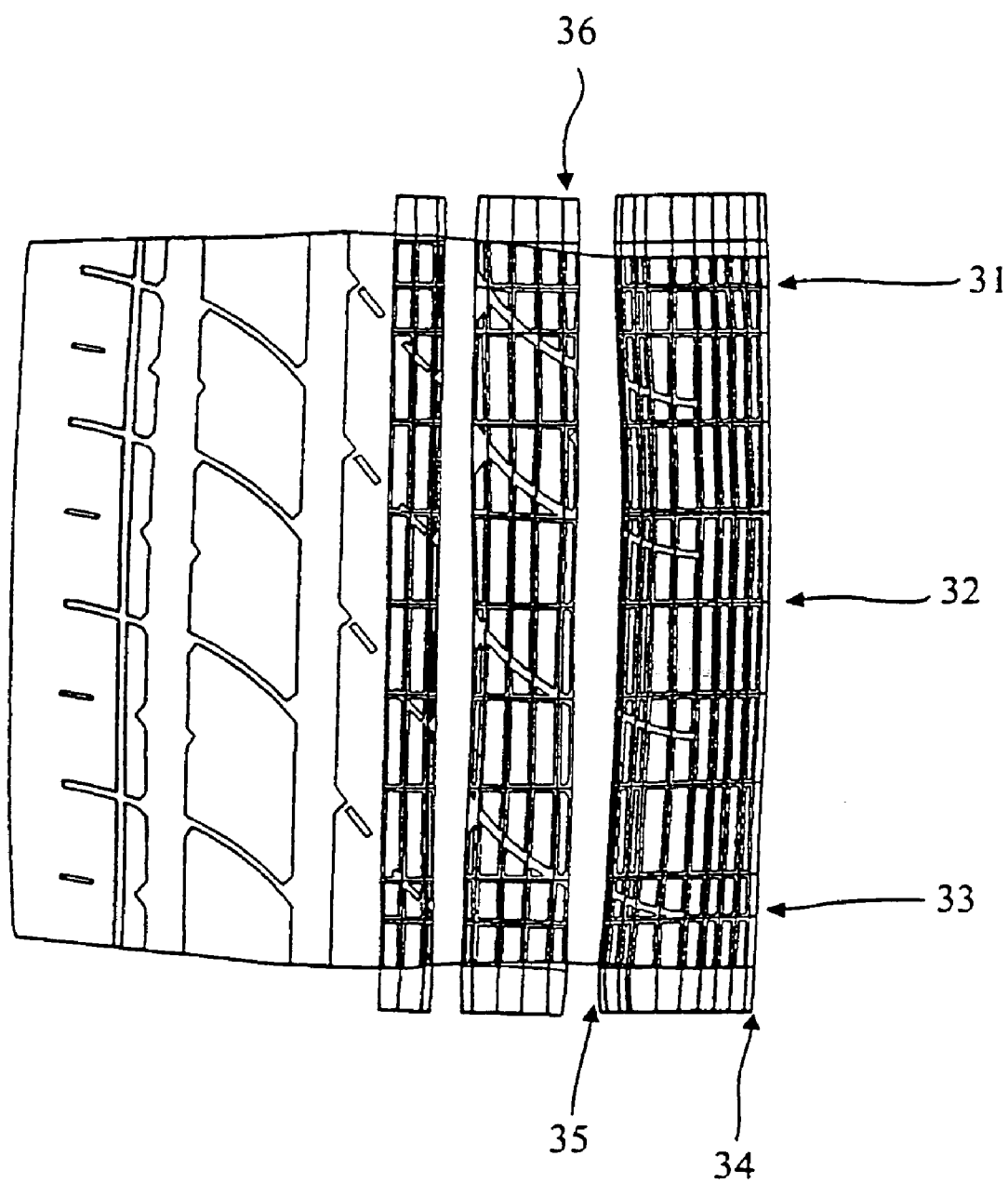
FIG. 3 shows the footprint area of a tread band according to the invention, rendered discrete by way of a finite element analysis.

The profile of the tread band as determined according to the present invention was the subject of a Finite Element Analysis by the Applicant in which verification of the results could be carried out. This method consisted in dividing the entire cross section of the tyre under examination into a plurality of three-dimensional elements and into a plurality of meridian sections (termed "segments" in the art) along the entire circumference of the tyre in question. Once the three-dimensional division had been made, the tyre was compressed statically, producing a footprint of the latter, rendered discrete in a plurality of rectangular elements as illustrated in FIG. 3. The said rectangular elements are quite simply the external faces of the three-dimensional elements constituting the tread band, deformed as a result of the force applied during the compressing action. The finite element computing program was able to determine the value of the tyre/ground contact pressure on each node, i.e. at each vertex of the abovementioned rectangular elements. The value measured on each node was then processed so as to obtain the pattern of the tyre/ground contact pressures conventionally represented in three cross sections respectively defining the zones 31, 32, 33 of the footprint area (as illustrated in FIGS. 4, 5 and 6).

Figure 4A:
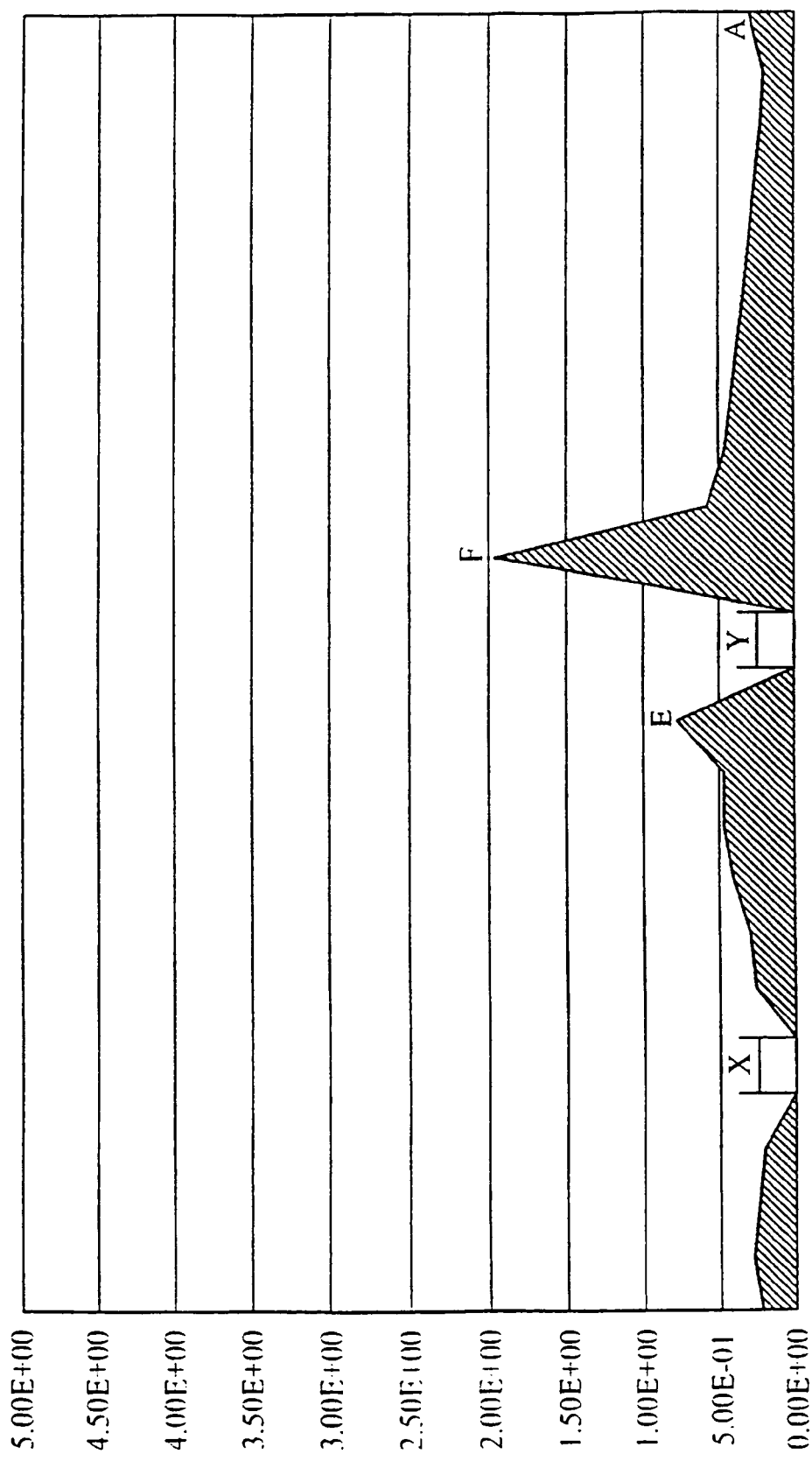
Figure 4C:
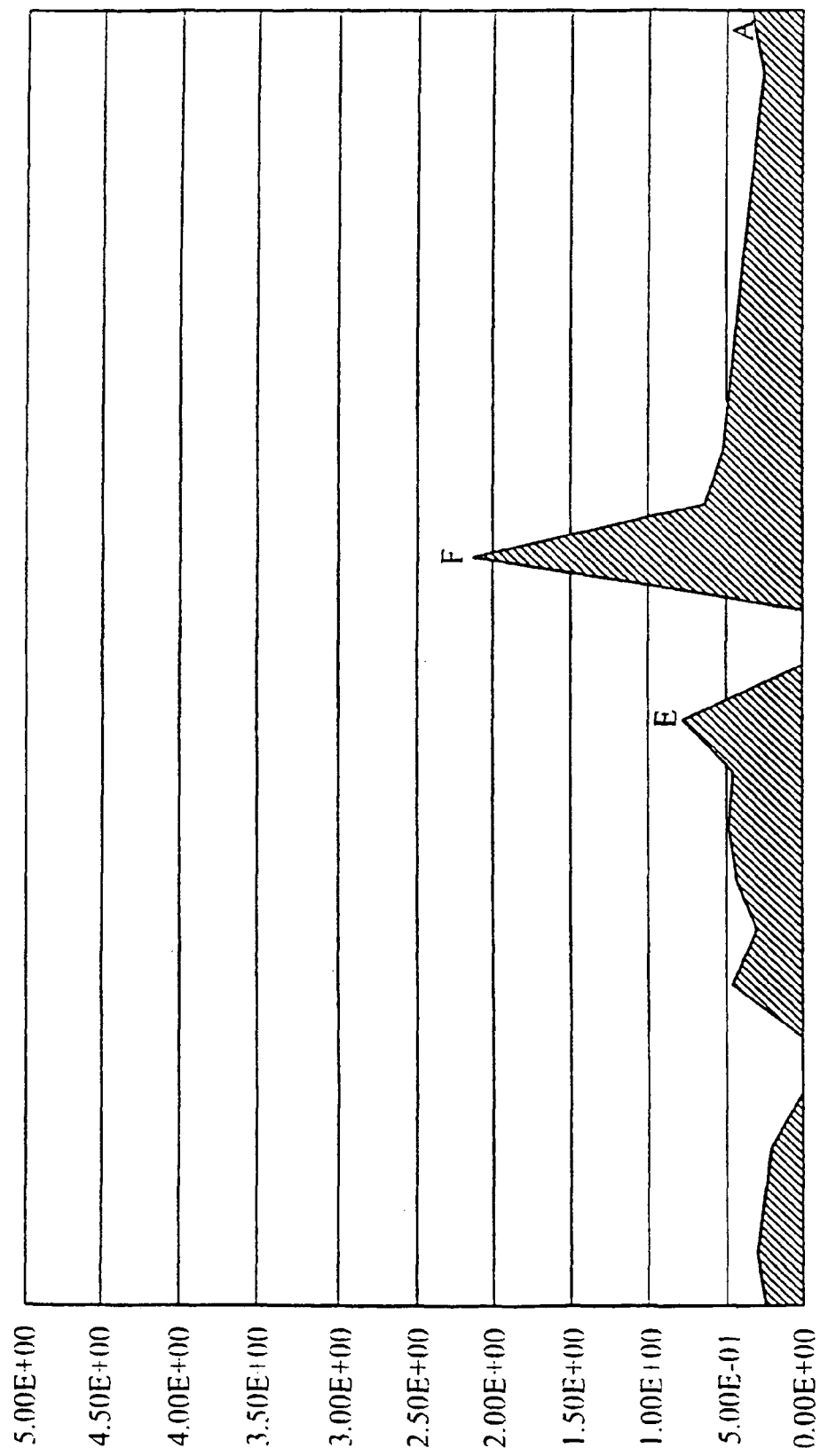

More particularly, FIGS. 4*a*, 4*b*, 4*c* illustrate on a Cartesian plane the pattern of the tyre/ground contact pressure (expressed in MPa) in the abovementioned zones 31, 32, 33 respectively for a reference tyre provided with a pair of symmetrical circumferential shoulder grooves and a pair of intermediate circumferential grooves. The above figures, as also the subsequent ones, refer, again for reasons of symmetry, to one half only of the tread band, and more particularly to that portion of tyre between the equatorial plane m-m' and the edge A. Each of the said figures presents a pair of zones X, Y where the value of the tyre/ground contact pressure is cancelled out, the said pair of zones corresponding in fact, starting from the left-hand zone of the graph, respectively to the intermediate circumferential groove 5 (zone X) and to the circumferential shoulder groove 3 (zone Y).

FIGS. 4*a*, 4*b*, 4*c*, and in particular FIG. 4*b* relative to the zone 32 of the footprint area, concern a reference tyre (measurement 295/80 R22.5), produced by the Applicant. These figures illustrate how the tyre/ground contact pressure is much greater local to the axially internal edge of the circumferential shoulder rib 2 than in the other zones of the tread band examined. This means, therefore, that the pressure measured at F is considerably greater than the pressure measured on the axially outer edge of the intermediate circumferential rib 4, i.e. at E. This aspect, as recalled above, produces a relative tyre/ground microsliding at the point E, inevitably inducing uneven wear patterns which arise in this zone but which, with the passage of time, tend to propagate rapidly towards the inner zone of the tread, i.e. in the direction of the equatorial plane of the tyre.

Figure 5A:
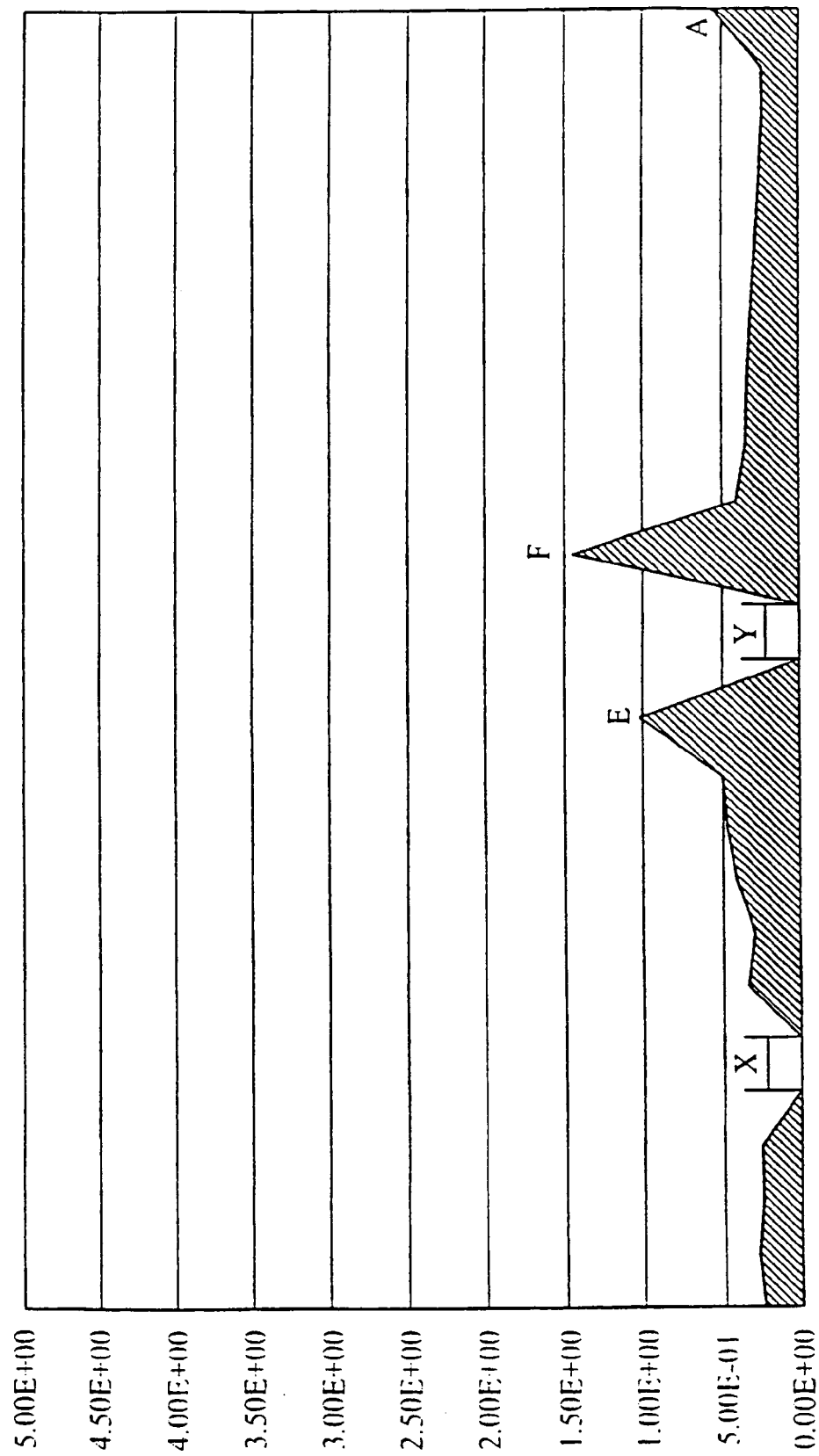
Figure 5B:
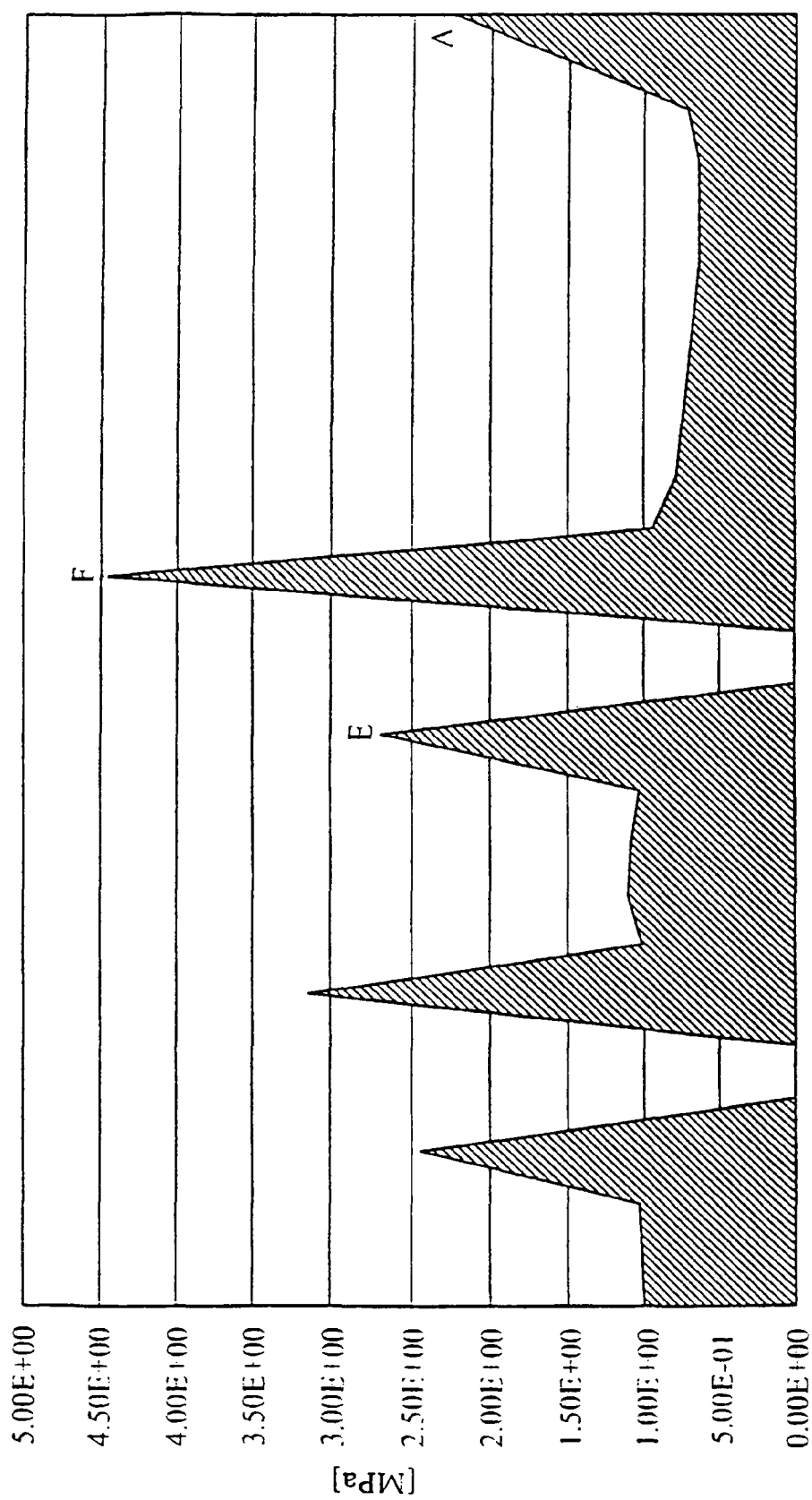
Figure 6B:
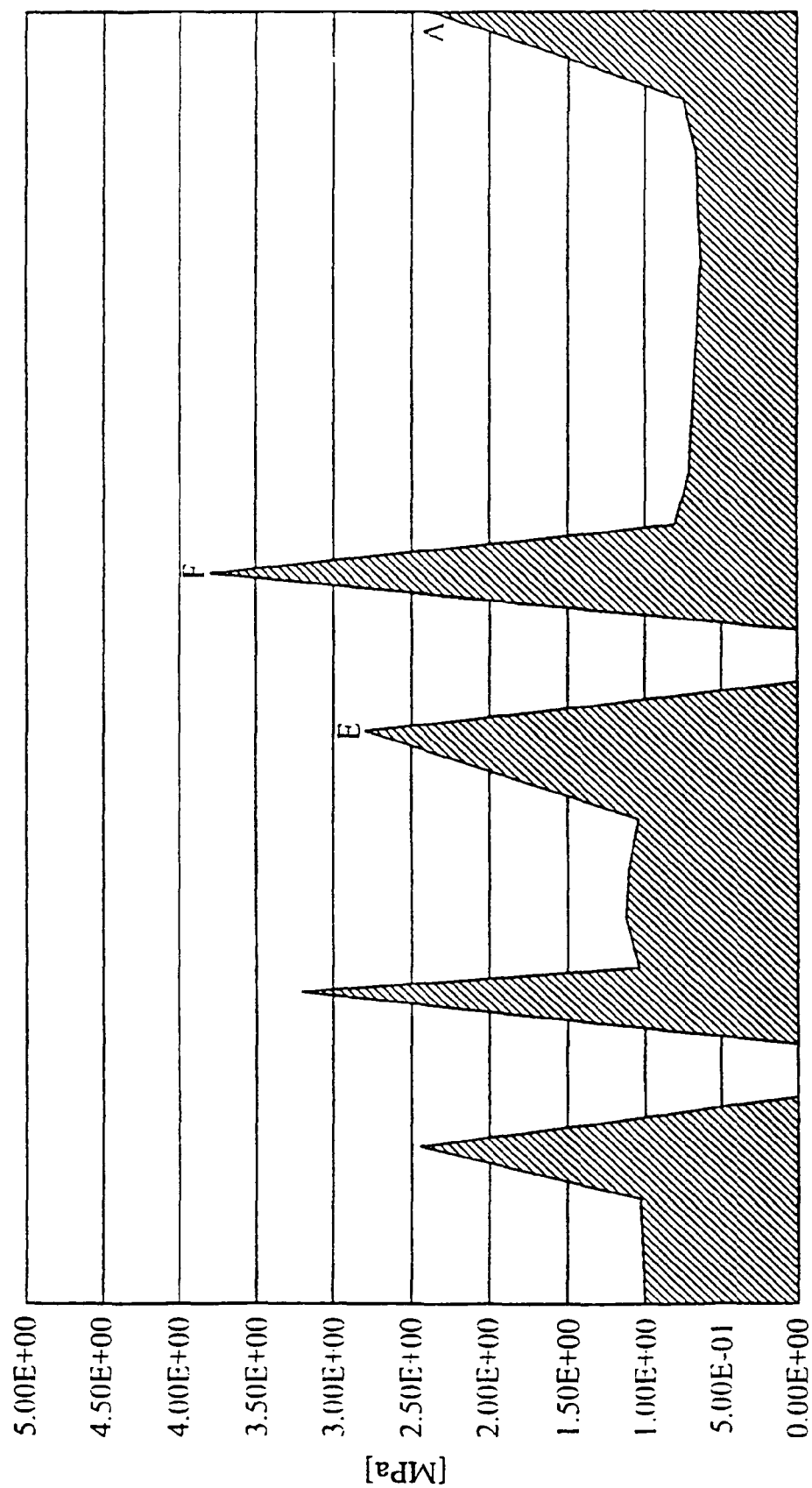

FIGS. 5*a*, 5*b*, 5*c* illustrate the behaviour of the tyre/ground contact pressure for a tread band 1 according to the present invention and of the type illustrated in FIG. 1. More particularly, the tread band 1 has an asymmetrical type circumferential shoulder groove and a discontinuity in the height profile δ of 0.5 mm. When FIG. 4*b*, showing a reference tyre, is compared with FIG. 5*b*, showing a tyre produced by the Applicant (measurement 295/80 R22.5 with δ=0.5 mm), it may be seen how the value of the tyre/ground contact pressure at the point F is lower for the tyre of the invention than for the reference tyre. Furthermore, an aspect even more significant, it must be pointed out that the difference in pressure between the point F and the point E is considerably less in the tyre of the invention than in the reference tyre. This tendency is confirmed and indeed further emphasized by taking into consideration a tyre according to the invention which is provided with an asymmetrical type circumferential shoulder groove and a discontinuity in the profile having a height δ of 1 mm, as illustrated in FIGS. 6*a*, 6*b*, 6*c*. More particularly, FIG. 6*b* demonstrates how the difference in pressure between the points F and E is even further reduced with respect to the case of the reference tyre, and also to the case of the tyre of the invention where δ is 0.5 mm. What is witnessed, therefore, is a decrease in the value of the pressure at the point F and a considerable increase in the pressure at the point E.

Furthermore, analysis of the graphs demonstrates how the value of the tyre/ground contact pressure local to the edge A increases going from a reference tyre to a tyre of the invention where δ is 0.5 mm and finally to a tyre of the invention where δ is 1 mm, a fact which, as recalled above, permits more even wear to be attained, even in the shoulder zone of the tyre, in itself a critical area and, with the passage of time, inevitably subject to the beginnings of uneven wear patterns. The reduction in the relative tyre/ground microsliding at the notoriously most critical points, therefore, enables the life of the tyre to be extended considerably, exploiting the latter's tread band for a longer time.

Figure 7:
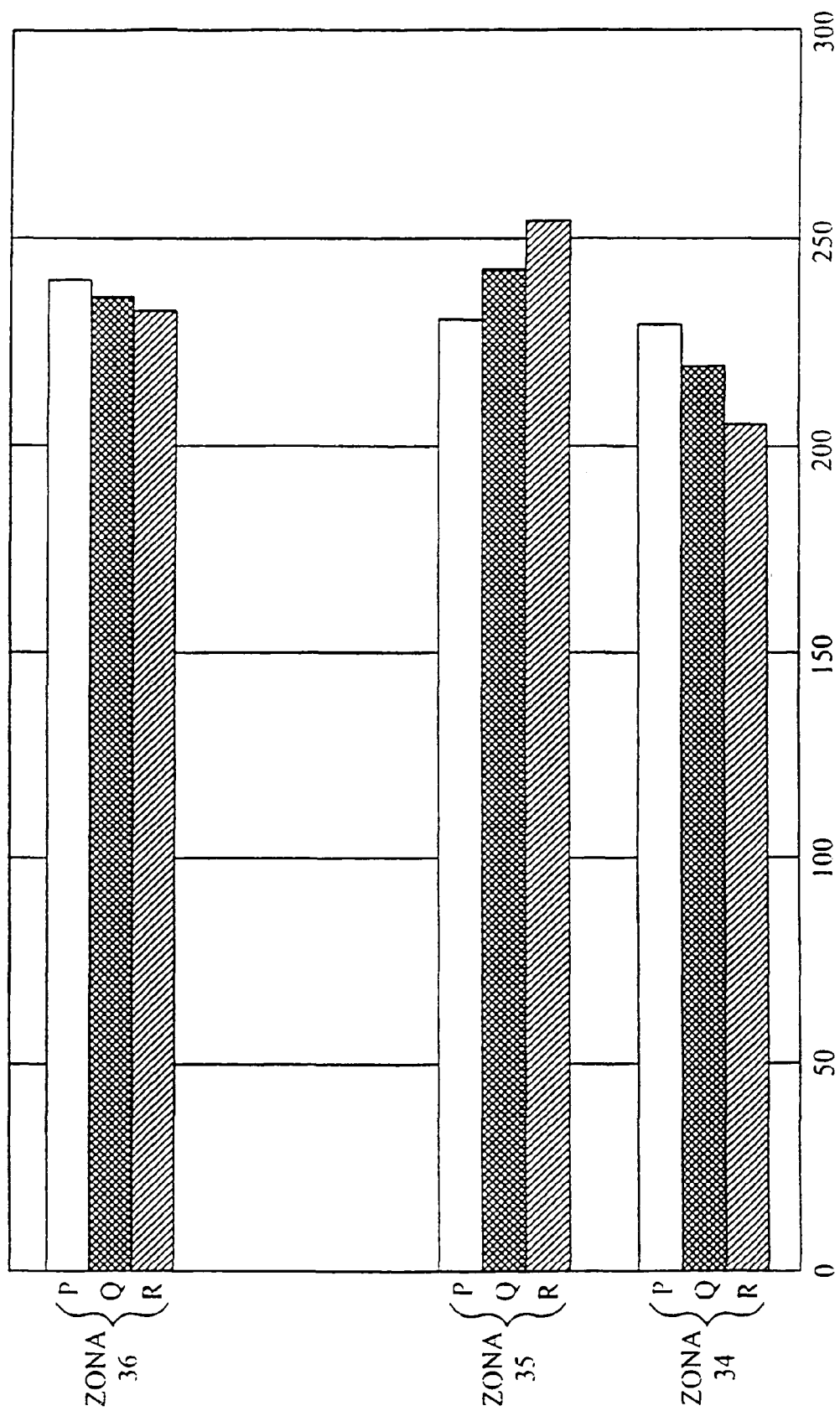
FIG. 7 illustrates the lengths of significant portions of the footprint area for a reference tread band and for a tread band according to two distinct embodiments of the invention, and FIG. 8 compares the variation of length of the footprint area for the tread bands of FIG. 7.

FIG. 7 illustrates schematically and in summary form what is shown in greater detail in FIGS. 4, 5, 6 described previously. The said FIG. 7, in fact, shows the length of the footprint (expressed in mm) local to the edge A (zone 34 of FIG. 3), to the axially internal edge F of the circumferential shoulder rib 2 (zone 35 of FIG. 3) and to the axially external edge E of the intermediate circumferential rib 4 (zone 36 of FIG. 3), respectively in the case of the reference tyre (FIG. 4), of a tyre of the invention where δ is 0.5 mm (FIG. 5), and of a tyre of the invention where δ is 1 mm (FIG. 6). In FIG. 7, defining with R, Q, P the columns representing the length of the footprint respectively of the reference tyre, of the tyre of the invention where δ is 0.5 mm, and of the tyre of the invention where δ is 1 mm in the respective zones 34, 35,36, it may be seen how the introduction of the discontinuity in height 6 makes the lengths of footprint more uniform in the above-mentioned zones, in the context of the same tyre. For example, from FIG. 7 it can be seen how, in the case of the reference tyre, there is a considerable imbalance in the length of the footprint, namely the column R, in the zones 35, 36 straddling the circumferential shoulder groove 3, this length being greater in the zone 35 than in the zone 36. In the case of the tyre of the invention where δ is 1 mm, on the other hand, the difference in the length of the footprint, namely the column P, in the zones 35, 36 is considerably less than the length of the footprint of the reference tyre. In particular, in the shoulder zone 34, a significant increase is observed in the length of the footprint between the reference tyre and the tyre of the invention where δ is 0.5 mm and where δ is 1 mm. This increase in the length of the footprint in the shoulder zone may be attributed to the special rotated profile of the circumferential shoulder rib.

At the same time, on the inner edge of the circumferential shoulder rib 2 (zone 35 of FIG. 3), there is a significant decrease in the said footprint length, whereas on the outer edge of the intermediate circumferential rib 4 (zone 36 of FIG. 3), there is an advantageous increase in this length.

FIG. 7 demonstrates, therefore, how the tread band according to the invention tends to render uniform the footprint lengths in the zone of the circumferential shoulder groove 3 and, as a result, to render uniform the tyre/ground contact pressures in the said zone. It is particularly important to stress how, on comparing the length of the footprint in the zones 35 and 36, the difference between the said two values is particularly high in the case of the reference tyre, whereas it progressively diminishes when moving from the case of the invention where δ is 0.5 mm to the case of the invention where δ is 1 mm. In the latter case, there is an inversion of the tendency, the length of the footprint in the zone 36 being greater than the length of the footprint in the zone 35. This difference between the lengths of footprint in the case of δ=1 mm is, in any event, in absolute terms, of the same order of magnitude as in the case of δ=0.5 mm.

Figure 8:
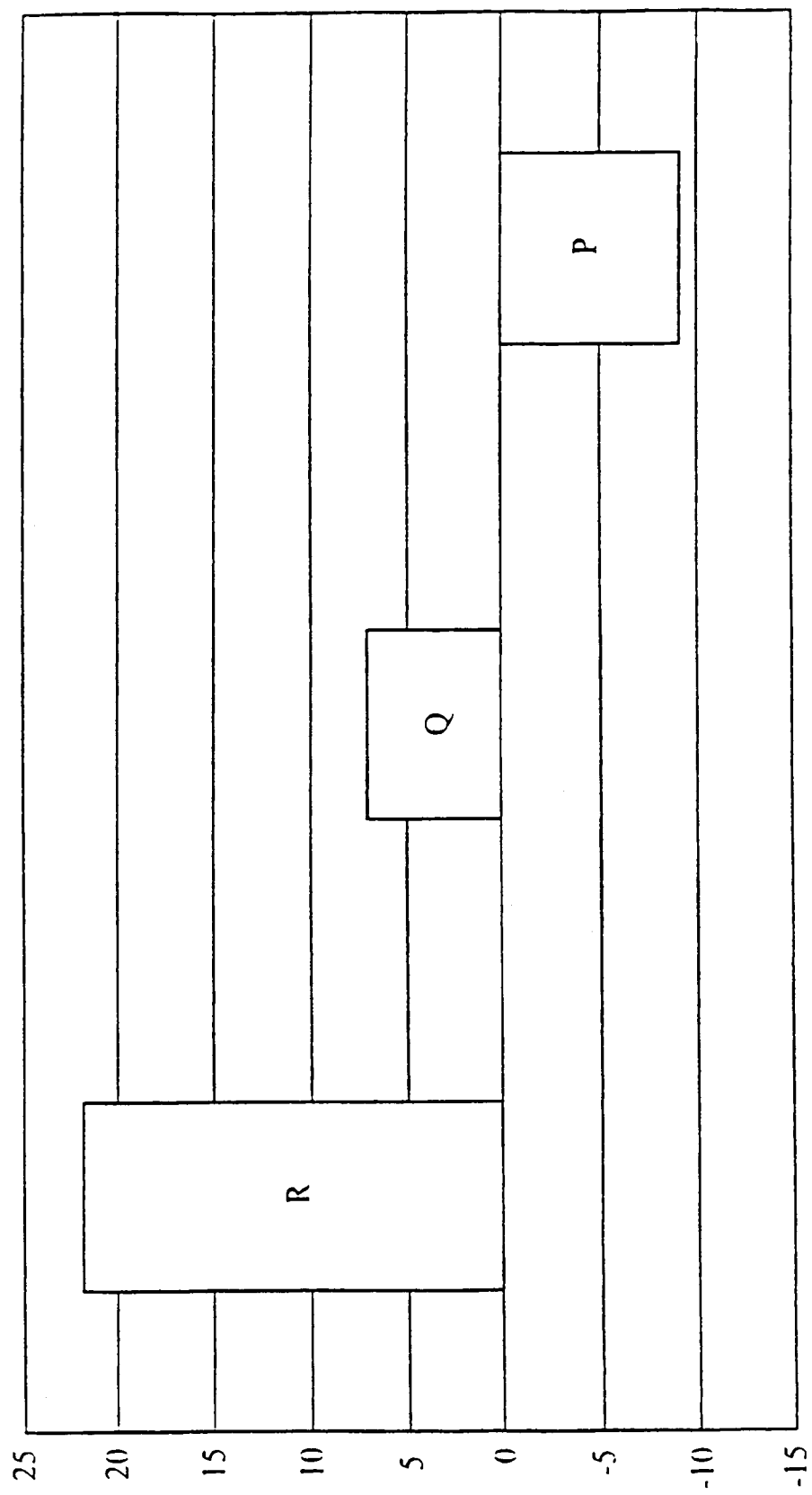

This phenomenon, and the correlated values, is represented graphically in FIG. 8, where the above described difference in length of the footprint between the zone 35 and the zone 36 is illustrated, respectively in the case of the reference tyre and in the cases of the tyre of the invention where δ is 0.5 mm and 1 mm.

The discontinuity of height δ with which the profile of the tread band according to the present invention is provided permits, as already said, a balancing out of the tyre/ground contact pressures in the zone straddling the circumferential shoulder groove, and more precisely between the points E and F as defined above. This positive effect of balancing the pressures is further and advantageously accentuated by the asymmetrical geometry of the cross-section of the circumferential shoulder groove 3, the latter being provided, as previously described, with walls having different angles of inclination α, β. Furthermore, as the angle α, i.e. the angle corresponding to the side facing the shoulder zone, is less than the angle β, i.e. the angle corresponding to the side facing the intermediate circumferential rib 4, the Applicant has surprisingly observed a further, advantageous increase in the tyre/ground contact pressure at the point E with respect to the point F. Finally, it is worthwhile stressing that the additional effect brought about by the asymmetrical geometry of the circumferential shoulder groove 3 remains advantageously for the entire working life of the tyre according to the invention, since this geometry of the groove is repeated over the entire depth of the groove.

The invention claimed is:

1. A tyre for a vehicle wheel, comprising:
a carcass structure, including a central crown portion and two axially-opposite sidewalls terminating in a pair of beads for attachment to a rim of the wheel;
a belt structure coaxially associated with the carcass structure; and
a tread band extended coaxially about the belt structure;
wherein the tread band is axially extended between two opposite edges of the tyre, wherein the edges delimit corresponding shoulder portions at axially-outer positions of the tread band, wherein the tread band is provided with a raised pattern comprising a plurality of circumferential ribs and grooves;
wherein each circumferential rib is delimited by an edge and a circumferential groove, wherein a cross section profile of the outermost circumferential rib of a first shoulder portion comprises a second rectilinear segment;
wherein a cross section of a radially-external reference profile of the tread band comprises at least one curving stretch and a first rectilinear segment, wherein the curving stretch extends axially outward to an intersection with one of the circumferential grooves, wherein the first rectilinear segment is tangent to the at least one curving stretch, extends axially outward from the at least one curving stretch at the one of the circumferential grooves, and extends beyond a corresponding shoulder edge point of the first shoulder portion;
wherein a cross section profile of the tread band is made from a consecutive succession of said at least one curving stretch and the second rectilinear segment, the second rectilinear segment being offset from the first rectilinear segment by an angle about a rotation point lying on the first rectilinear segment, the cross section profile of the tread band having a discontinuity of height δ because an axially-inner end of the second rectilinear segment is closer to the carcass structure than an axially-inner end of the first rectilinear segment, wherein the rotation point is axially outward of the corresponding shoulder edge point by a distance not more than 30% of a total width of the tread band;
wherein the discontinuity gives rise to an increase in tyre/ground contact pressure at an inner axial point of the circumferential groove and to a reduction in the tyre/ground contact pressure at an outer axial point of the circumferential groove, as compared to a reference tyre not provided with the discontinuity of height δ;

wherein the axially-inner end of the second rectilinear segment is located in a radially outer position with respect to an axially outer end of the second rectilinear segment; and wherein the height δ is between 0.2 and 1.5 mm.

2. The tyre of claim 1, wherein a difference between a ground contact pressure at the outer axial point and at the inner axial point of the circumferential groove is in absolute value less than or equal to 2 MPa in rolling conditions.

3. The tyre of claim 1, wherein the rotation point is at the intersection of the first rectilinear segment with a straight line tangent to a side of the tread band.

4. The tyre of claim 1, wherein the distance is between 10% and 30% of the total width of the tread band.

5. The tyre of claim 1, wherein a circumferential shoulder groove corresponding, in an axially-internal position, to the outermost circumferential rib is of an asymmetrical type.

6. The tyre of claim 5, wherein an axially-external wall of the asymmetrical groove forms a first angle between 7° and 16° with respect to an axis of the asymmetrical groove.

7. The tyre of claim 5, wherein an axially-internal wall of the asymmetrical groove forms a second angle between 14° and 22° with respect to an axis of the asymmetrical groove.

8. The tyre of claim 6, wherein an axially-internal wall of the asymmetrical groove forms a second angle between 14° and 22° with respect to the axis of the asymmetrical groove, and wherein a difference between the first angle and the second angle is between 4° and 8°.

9. The tyre of claim 1, wherein the cross section profile of the tread band comprises a first curving stretch with a first radius of curvature and second curving stretch with a second radius of curvature, wherein the second radius of curvature is greater than the first radius of curvature.

10. The tyre of claim 1, wherein the cross section profile of the tread band comprises a consecutive succession of a first curving stretch with a first radius of curvature, a second curving stretch with a second radius of curvature, and the second rectilinear segment.

11. The tyre of claim 1, wherein the tread band comprises at least one further circumferential groove dividing the outermost circumferential rib of the first shoulder portion into first and second circumferential shoulder ribs.

12. The tyre of claim 11, wherein a cross section profile of the second circumferential shoulder rib is parallel and lowered with respect to the second rectilinear segment of a cross section profile of the tread band.

13. The tyre of claim 12, wherein the lowering is between 0.1 mm and 1.5 mm.

14. The tyre of claim 11, wherein the at least one further circumferential groove is asymmetrical.

15. The tyre of claim 11, wherein a depth of the at least one further circumferential groove is between 70% and 100% of a depth of the plurality of circumferential grooves.

16. The tyre of claim 11, wherein a width of the second circumferential shoulder rib is between 25% and 40% of a width of the first shoulder portion.

17. The tyre of claim 16, wherein the width of the second circumferential shoulder rib is equal to 33% of the width of the first shoulder portion.

18. The tyre of claim 1, wherein the discontinuity is between 0.3 mm and 1 mm.

19. A tyre for a vehicle wheel, comprising:

a carcass structure, including a central crown portion and two axially-opposite sidewalls terminating in a pair of beads for attachment to a rim of the wheel;

a belt structure coaxially associated with the carcass structure; and a tread band extended coaxially about the belt structure;

wherein the tread band is axially extended between two opposite edges of the tyre, wherein the edges delimit corresponding shoulder portions at axially-outer positions of the tread band, wherein the tread band is provided with a raised pattern comprising a plurality of circumferential ribs and grooves, a circumferential rib being delimited by two circumferential grooves, an inner axially circumferential groove and an outer axially circumferential groove;

wherein a cross section of a radially-external reference profile of the tread band comprises at least one curving stretch and a first rectilinear segment, the curving stretch extending axially outward to an intersection with one of the circumferential grooves, the first rectilinear segment being tangent to the at least one curving stretch, extending axially outward from the at least one curving stretch at the one of the circumferential grooves, and extending beyond a corresponding shoulder edge point of a first shoulder portion;

wherein a cross section profile of an outermost circumferential rib of the first shoulder portion comprises a second rectilinear segment, a cross section profile of the tread band being made from a consecutive succession of said at least one curving stretch and the second rectilinear segment;

wherein the second rectilinear segment is offset from the first rectilinear segment by an angle about a rotation point lying on the first rectilinear segment so that an axially-inner end of the second rectilinear segment is closer to the carcass structure than an axially-inner end of the first rectilinear segment, the rotation point being axially outward of the corresponding shoulder edge point by a distance not more than 30% of a total width of the tread band;

wherein the cross section profile of the tread band has a discontinuity of height δ because the axially-inner end of the second rectilinear segment is closer to the carcass structure than the axially-inner end of the first rectilinear segment, the discontinuity giving rise to an increase in tyre/ground contact pressure at an inner axial point of the outer axially circumferential groove and to a reduction in the contact pressure at an outer axial point of the outer axially circumferential groove, as compared to a reference tyre not provided with the discontinuity of height δ;

wherein the axially-inner end of the second rectilinear segment is located in a radially outer position with respect to an axially outer end of the second rectilinear segment; and wherein the height δ is between 0.2 and 1.5 mm.

20. The tyre of claim 19, wherein a difference between a ground contact pressure at the outer axial point and at the inner axial point of the outer axially circumferential groove is in absolute value less than or equal to 2 MPa in rolling conditions.

21. The tyre of claim 19, wherein the rotation point is at the intersection of the first rectilinear segment with a straight line tangent to a side of the tread band.

22. The tyre of claim 19, wherein the distance is between 10% and 30% of the total width of the tread band.

23. The tyre of claim 19, wherein a circumferential shoulder groove corresponding, in an axially-internal position, to the outermost circumferential rib is of an asymmetrical type.

24. The tyre of claim 23, wherein an axially-external wall of the asymmetrical groove forms a first angle between 7° and 16° with respect to an axis of the asymmetrical groove.

25. The tyre of claim 23, wherein an axially-internal wall of the asymmetrical groove forms a second angle between 14° and 22° with respect to an axis of the asymmetrical groove.

26. The tyre of claim 24, wherein an axially-internal wall of the asymmetrical groove forms a second angle between 14° and 22° with respect to the axis of the asymmetrical groove, and wherein a difference between the first angle and the second angle is between 4° and 8°.

27. The tyre of claim 19, wherein the cross section profile of the tread band comprises a first curving stretch with a first radius of curvature and second curving stretch with a second radius of curvature, wherein the second radius of curvature is greater than the first radius of curvature.

28. The tyre of claim 19, wherein the cross section profile of the tread band comprises a consecutive succession of a first curving stretch with a first radius of curvature, a second curving stretch with a second radius of curvature, and the second rectilinear segment.

29. The tyre of claim 19, wherein the tread band comprises at least one further circumferential groove dividing the outermost circumferential rib of the first shoulder portion into first and second circumferential shoulder ribs.

30. The tyre of claim 29, wherein a cross section profile of the second circumferential shoulder rib is parallel and lowered with respect to the second rectilinear segment of a cross section profile of the tread band.

31. The tyre of claim 30, wherein the lowering is between 0.1 mm and 1.5 mm.

32. The tyre of claim 29, wherein the at least one further circumferential groove is asymmetrical.

33. The tyre of claim 29, wherein a depth of the at least one further circumferential groove is between 70% and 100% of a depth of the plurality of circumferential grooves.

34. The tyre of claim 29, wherein a width of the second circumferential shoulder rib is between 25% and 40% of a width of the first shoulder portion.

35. The tyre of claim 34, wherein the width of the second circumferential shoulder rib is equal to 33% of the width of the first shoulder portion.

36. The tyre of claim 19, wherein the discontinuity is between 0.3 mm and 1 mm.

* * * * *